Fig. 1 Specific Conductivity v. Absolute Temperature
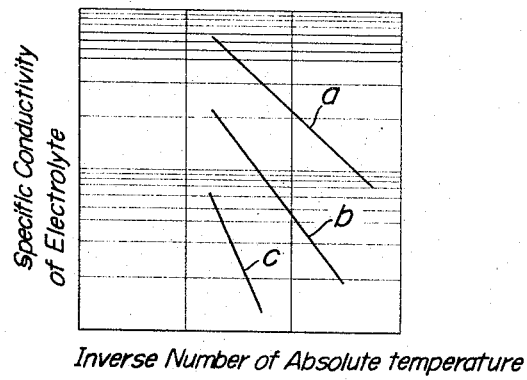
Fig. 2 Leakage Current v. Time in High-Temperature Life Test
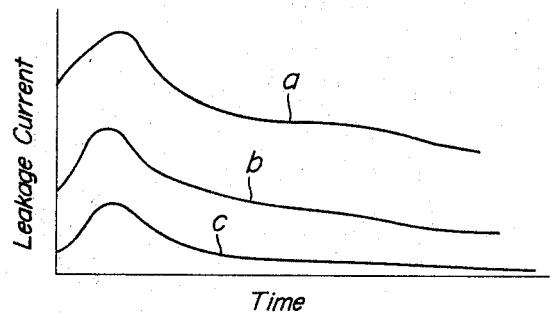

Leakage Current v. Temperature

Electrostatic Capacity v. Temperature

INVENTORS
Masaaki Hagihara
Takayoshi Muranaka
By Stevens, Davis, Miller & Mosher
ATTORNEYS

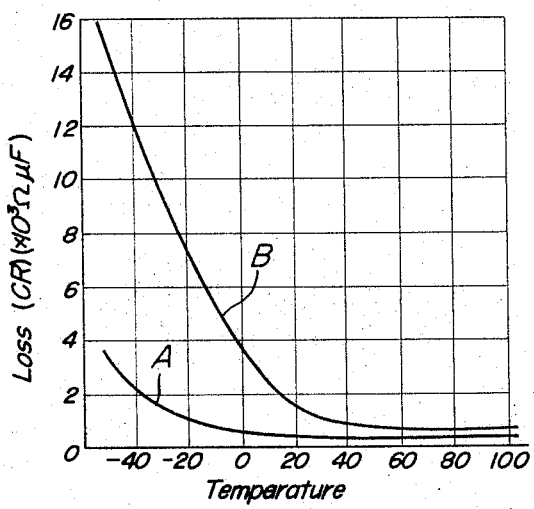
Fig. 5  Loss v. Temperature
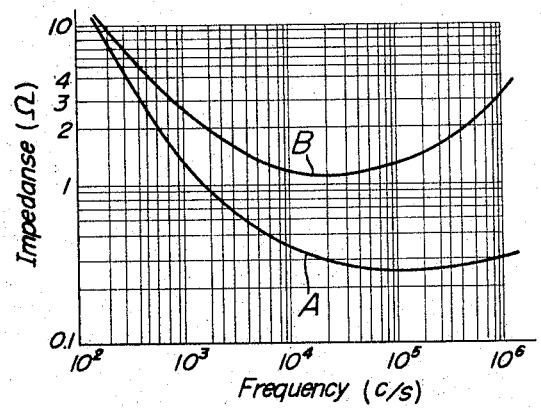
Fig. 6  Impedance v. Frequency

United States Patent Office

3,329,873
ELECTROLYTIC CAPACITOR COMPRISING AN ARSENIC COMPOUND ADJACENT THE ELECTRODE SURFACE
Masaaki Hagihara, Hirakata-shi, and Takayoshi Muranaka, Moriguchi-shi, Japan, assignors to Matsushita Electric Industrial Co., Ltd., Osaka, Japan, a corporation of Japan
Filed Feb. 24, 1964, Ser. No. 346,636
Claims priority, application Japan, Mar. 19, 1963, 38/14,817
4 Claims. (Cl. 317—230)

This invention relates to electrolytic capacitors, and more particularly to those generally called wet-type or dry-type.

An object of the present invention is to provide an electrolytic capacitor having a wide range of operating temperature from low to high temperatures, with low leakage current and low change in electrostatic capacity as well as CR-products.

Another object of the present invention is to provide an electrolytic capacitor of the kind above-specified which is extremely stable in electric characteristics, long in useful life, and high in reliability.

A further object of the present invention is to provide an electrolytic capacitor having superior temperature characteristics particularly useful at high temperatures.

There are other objects and particularities of the present invention, which will be made obvious from the following detailed description with reference to the accompanying drawings, in which:

FIG. 1 is a characteristic curve diagram showing relations between specific conductivities of electrolytes and temperature;

FIG. 2 shows relations between leakage currents and time in high-temperature life tests on aluminum electrolytic capacitors with rated voltages applied thereon;

FIG. 5 is a temperature characteristic curve diagram showing changes in CR-products of a conventional electrolytic capacitor and that embodying the present invention;

FIG. 6 is a frequency characteristic curve diagram showing changes in impedances of a conventional electrolytic capacitor and that embodying the present invention;

Figure 3:
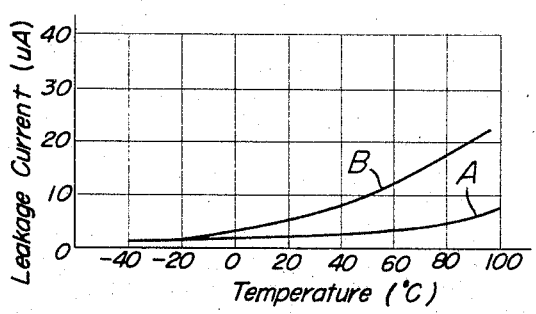
FIG. 3 is a temperature characteristic curve diagram showing changes in leakage currents of a conventional electrolytic capacitor and that according to the present invention.
Figure 4:
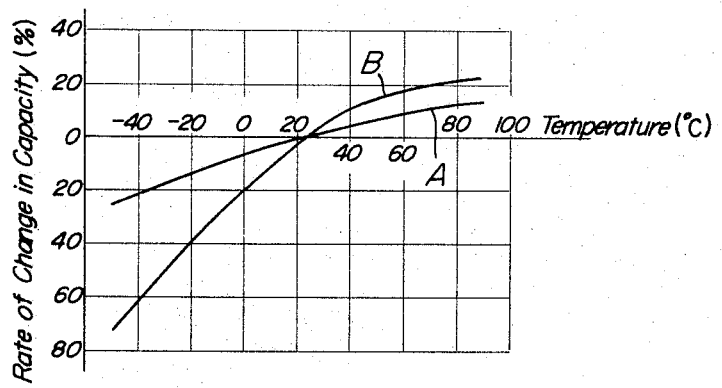
FIG. 4 is a temperature characteristic curve diagram showing changes in electrostatic capacities of a conventional electrolytic capacitor and that according to the present invention.

In general, so-called wet-type or dry-type electrolytic capacitors employ, as operating electrolytes, liquid electrolytes which may be an aqueous solution or non-aqueous solution. Consequently, their temperature characteristics, high-temperature life characteristics, etc. are particularly inferior to those of solid-type electrolytic capacitors using manganese dioxide, etc. This is deemed the most significant fault of wet-type or dry-type electrolytic capacitors. In other words, the operating electrolyte is the most important element with respect to the characteristics of wet-type or dry-type electrolytic capacitors, and greatly affects the same.

We have made an elaborate study mainly on operating electrolyte pastes for improving them, whereby dry-type or wet-type electrolytic capacitors have been provided with performances far superior to those of conventional ones.

In conventional aluminum electrolytic capacitors, particularly for low voltage use, when they are used at high temperatures above 85° C., changes in electrostatic capacities and CR-products are so great, and their characteristics are very unstable. Consequently, their useful lives are short, and when they are used at high temperatures, their life characteristics are extremly bad, and their reliabilities are very low. Therefore, in order to obtain comparatively good life characteristics at high temperatures of low-voltage aluminum electrolytic capacitors, the forming voltages have been made higher than necessary with respect to rated working voltages or surge voltages, whereby electrodes are made with comparatively thick oxide films, and in addition, operating electrolyte pastes of low specific conductivity have been used.

However, in aluminum electrolytic capacitors of the above-mentioned prior art, capacitors themselves become very large in size, and in addition, their CR-products are relatively high or their equivalent series resistances or impedances are relatively high, so that electric machinery of every kind using such capacitors are of relatively large size. Moreover, such capacitors are relatively bad in temperature characteristics, particularly in low temperature ranges in which they cannot operate substantially.

Electrolyte pastes employed in electrolytic capacitors greatly affect temperature characteristics, high-temperature life characteristics, etc., as mentioned above, and physical and chemical characteristics of electrolytes employed greatly affect the characteristics of electrolyte capacitors. In other words, temperature characteristics of electrostatic capacities, and CR-products or dissipation factor (tan δ) of electrolytic capacitors are affected mainly by the temperature characteristics of specific conductivities of the electrolyte pastes employed. As the temperature characteristics of specific conductivities of the electrolytes used become better, the temperature characteristics of the electrolytic capacitors are better, with low changes in electrostatic capacities, and low CR-products and dissipation factor (tan δ).

According to our experiments, electrolytes of polyhydric alcohol-ammonium system, such as boric acid and its salts—ethylene glycols, or the like, having high specific conductivities at normal temperatures, are low in specific-conductivity change even at low temperatures, good in temperature characteristics of specific conductivities, and substantially applicable to the following equations showing natures of glass, and the specific conductivities of electrolytes increase with a rise of temperature.

$$K = A \exp\left(-\frac{Q}{RT}\right) \quad (1)$$

$$\log K = \frac{Q}{2.303 RT} + \log A \quad (2)$$

where
$K$ = specific conductivity of electrolyte
$A$ = a constant
$R$ = gas constant
$T$ = absolute temperature
$Q$ = activation heat for electric conduction of electrolyte As is known for Equation 2, the relation between log K and $1/T$ is linear as shown in FIG. 1, and the angle of inclination of line $a$ is the smallest, showing that its temperature characteristics of specific conductivity are the best of the three. If such an electrolyte is employed, the temperature characteristics of electrolytic capacitors will clearly be improved.

On the other hand, the life characteristics of an electrolytic capacitor are substantially affected by their leakage currents. Consequently, in order to provide long-life, high-reliability electrolytic capacitors, it is most necessary to know how to decrease leakage currents. With regard to the relation between leakage currents and resistances of electrolytes, even in substantially ohmic ones, the higher the specific resistance, the smaller the leakage current. This is made clear by applying voltage continuously on the electrolytic capacitor at high temperatures to effect its life test, while measuring leakage current of the capacitor at high temperatures. As has been described above, the life characteristics at high temperatures of an electrolytic capacitor are greatly affected by the amount of leakage current or the quantity of electricity (leakage current×time) at high temperatures, and the smaller the quantity of electricity, the better the high-temperature life characteristics.

Figure 7:
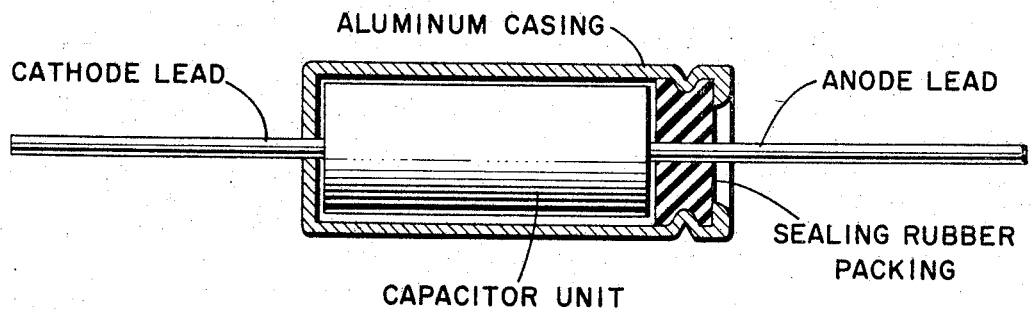
FIG. 7 is a view, partially in section, of an example of the inventive capacitor.

FIG. 2 shows the results of measurements of leakage currents against time at high temperatures in life tests with W.V. applied on aluminum electrolytic capacitors employing three kinds (a), (b), (c) of electrolytes having different specific conductivities, respectively. As is obvious from FIG. 2, the higher the specific conductivity of electrolyte, the lower the leakage current, and the smaller the quantity of electricity (leakage current×time) which has flowed through the capacitor. If the leakage current or the quantity of electricity during high temperatures of electrolytic capacitor operation is low, the amount of evolution gases due to Faraday's law, such as hydrogen, oxygen, nitrogen, and other forming gases is small, resulting in low vapor pressure applied to the sealed mouth portion of the electrolytic capacitor, and expansion and protrusion of the sealing rubber of the mouth portion, breakage of the anti-explosion valve, etc., are eliminated, resulting in long useful life and stability of the electrolytic capacitor. In addition, the oxide film as well as electrolyte itself are substantially prevented from deterioration, and good electrolytic capacitors of high reliability are provided. As is described above, the higher the specific conductivity of the electrolyte, the better the temperature characteristics of electrostatic capacity, CR-products, dissipation factor (tan $\delta$), etc. of the electrolytic capacitor, but the high-temperature life characteristics and stability of the electrolytic capacitor are better when electrolyte of lower specific conductivity is employed. An example of the structure of a capacitor, according to the present invention, has been shown in FIG. 7.

Therefore, there is a contradictory relation between the specific conductivity of electrolyte used and the high-temperature characteristics of the electrolytic capacitor, so that it is very difficult, from a technical point of view also, to provide an electrolytic capacitor always having stable characteristics, long useful life and high reliability, in a wide range of working temperature from low to high temperatures. Consequently, we have not been able in practice to obtain any conventional aluminum electrolytic capacitor having satisfactory temperature characteristics and high-tempearture life characteristics, as well as shelf life characteristics, etc.

Thus, one of our most important interests is to provide an electrolytic capacitor employing an electrolyte having high specific conductivity that improves temperature characteristics of the capacitor, and yet having low leakage current at high temperatures and good high-temperature life characteristics. For providing such an electrolytic capacitor, we have completed the present invention after elaborate study based on an idea to employ any kind of addition agent that is effective to prevent deterioration of aluminum metal and its oxide film and also to protect them, for keeping leakage current at high temperatures as low as possible with an electrolyte having high specific conductivity. If aluminum metal and its oxide film are prevented from deterioration, and there always exists stable dielectric film, leakage current does now flow substantially. Even if there would have occurred any such default in the dielectric film that makes the film conductive, the addition agent should repair the dielectric film promptly to recover its insulating capacity for preventing leakage current.

We have accordingly studied and tested on many kinds of addition agents, and have found and confirmed that the addition agents mentioned below have been remarkably effective to accomplish satisfactory results.

Thus, we propose to add to conventional electrolytes small amounts of arsenic acid, biarsenic acid, arsenious acid, or their salts, etc., or to form on aluminum electrodes films of the above-mentioned addition agents, for constructing electrolytic capacitors, whereby temperature characteristics and high-temperature life characteristics, as well as shelf life characteristics, etc., are improved, and in addition, electrical characteristics of electrolytic capacitors are remarkably improved also.

In the electrolytic capacitor embodying the present invention, electrolytes are employed which contain mixtures of boric acid and its salts—ethylene glycol or other polyhydric alcohol—ammonium system of common use, and in addition, small amounts of arsenic acid or its salt, such as ammonium arsenate, biarsenic acid or its salt, such as biarsenic sodium, arsenious acid or its salt, or other arsenic compound for formulating the operating or forming electrolytes. Such addition agents are not necessarily added to electrolytes for dissociation therein, but may be used for forming films or layers of such addition agents on the aluminum electrodes. According to the present invention, electrolytes of high specific conductivities may be employed for improving temperature characteristics of aluminum electrolytic capacitors, with low leakage current or small quantity of electricity (leakage current×time) at high-temperatures, and stable aluminum electrolytic capacitors are thus provided with superior high-temperature life characteristics and shelf life characteristics.

In the manufacture of the present electrolytic capacitors, it should be noted that the amounts of arsenic compounds contained in the electrolytes remarkably affect their characteristics, too much or too small amounts of addition agents resulting in little effect. We have confirmed that the best result is obtained with an addition agent of substantially a few percent (about 3 to 0.1% by weight).

Figure 8:
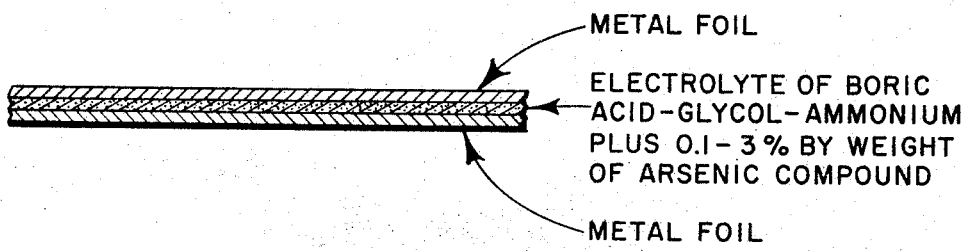
FIG. 8 is a detailed sectional view of the film used in the inventive capacitor.

The following table shows in comparison various characteristics of conventional aluminum electrolytic capacitor and that embodying the present invention, and their temperature characteristics of leakage currents, temperature characteristics of electrostatic capacities, temperature characteristics of CR-products, and frequency characteristics of impedances are shown in FIGS. 3, 4, 5 and 6, respectively. In such figures of drawings, A designates an aluminum electrolytic capacitor according to the present invention, while B designates conventional aluminum electrolytic capacitor. The capacitors under test were polarized electrolytic capacitors employing aluminum foils, such as the foil illustrated in FIG. 8, with same ratings of rated working voltage (W.V.) of 3 v., and rated electrostatic capacity of 100 $\mu$f., and with same degree of electrode purity, forming voltage, separators used, casing size, etc., except the electrolytes. Methods of measurements of various quantities were also same for both cases.

LIFE CHARACTERISTICS AT 85° C. WITH WORKING VOLTAGE (W.V.) APPLIED CONTINUOUSLY

| | Initial CR-products directly after manufacture of electolytic capacitor (temperature: 20° C.) (frequency: 120 c./s.) | Characteristics after life test with rated voltage applied for 1,000 hrs. at 85° C. (measured at 20° C.) | | |
|---|---|---|---|---|
| | | Electrostatic capacity | CR-products | Leakage current ($IA$) |
| (a) Conventional electrolytic capacitor durable for life test of 1,000 hrs. at 65° C. | 200–300 $\Omega\mu F$ (see note). | Decreased by 52% of initial value. | Increased by 3.2 times of initial value. | 3.5 |
| (b) Conventional electrolytic capacitor durable for life test of 1,000 hrs. at 85° C. | 1,000–1,400 $\Omega\mu F$ | Decreased by 26% of initial value. | Increased by 2.1 times of initial value. | 1.5 |
| (c) Electrolytic capacitor according to the invention with addition agent of 1–3%. | 200–300 $\Omega\mu F$ | Increased by 5.5% of initial value. | Increased by 1.1 times of initial value. | 0.06 |

*Note.*—At about 250 hours of 85° C. life test, the electrostatic capacity decreased by 25%, the sealed mouth portion expanded, and the electrolyte leaked out remarkably, so that the capacitor became substantially inoperative.

As hereinabove described, the present invention merely contemplates to add a small quantity of arsenic compound to conventional electrolyte of electrolytic capacitor. Accordingly, any additional apparatus or appliance is not required for carrying out the present invention. In addition, there is required no additional step in manufacturing the capacitor, except the addition of an arsenic compound to the electrolyte. Consequently, the cost of the new electrolytic capacitor is not increased substantially over the conventional one. According to the invention, the electrolytic capacitor is of exremely low CR-products in comparison to the conventional one, and in addition, has good temperature characteristics over a wide temperature range from −40° C. to +85° C., so that unstability of voice, noise, oscillation, etc., in various electrical circuits due to the amount of absolute value of equivalent series resistances (R) or impedances (Z) of aluminum electrolytic capacitors may be prevented, and characteristics of the electrical circuits may be improved remarkably.

In electrical circuits employing electrolytic capacitors, in general, the electrostatic capacities of capacitors are selected higher than essentially required, in consideration of the fact that the equivalent series resistance or impedance of an electrolytic capacitor increase at low temperatures, whereby the equivalent series resistance and impedance are kept low. However, if the capacitor according to the present invention is used, the equivalent series resistance or impedance at low temperatures being extremely low in comparison to the conventional capacitor, the electrostatic capacity of the new electrolytic capacitor may be far lower than that heretobefore been used in many cases, in which cases the size, cost, etc., of an electrolytic capacitor may be decided very favorably to the designer of the set in various technical points.

The electrolytic capacitor according to the present invention is of small size, and good in temperature characteristics in a wide working temperature range. In addition, the frequency characteristics of impedance is such that the capacitor is useful even in a relatively high frequency range in comparison to the conventional electrolytic capacitor. As the useful frequency range is enlarged, the use of the new capacitor is broadened remarkably, with improved frequency characteristics, as well as high-temperature life characteristics and shelf life characteristics, etc., of extreme stability, and long useful life and high reliability.

We claim as our invention:

1. An electrolytic capacitor comprising electrodes and electrolyte with the electrodes having electrolyte contacting surfaces, said electrolyte consisting of a mixture of boric acid—glycol—ammonium system, at least one of said electrodes having a dielectric film forming the contacting surface thereof, and an arsenic compound selected from the group consisting of arsenic acid, arsenic acid salt, biarsenic acid, biarsenic acid salt, arsenious acid and arsenious acid salts distributed throughout the area of said dielectric film contacting surface.

2. The electrolytic capacitor according to claim 1, in which said arsenic compound is added to said electrolyte in a small percentage in the range of 0.1 to 3 percent by weight.

3. The electrolytic capacitor according to claim 1, in which said arsenic compound is in the form of films on said electrodes.

4. The electrolytic capacitor according to claim 1, in which said arsenic compound is added to said electrolyte in a small percentage up to about 3 weight percent.

References Cited

UNITED STATES PATENTS

| 1,255,391 | 2/1918 | Coulson | 317—230 |
| 1,891,207 | 12/1932 | Ruben | 317—230 |
| 1,950,352 | 3/1934 | Curtis | 317—230 |

FOREIGN PATENTS

| 334,495 | 12/1903 | France. |

JAMES D. KALLAM, *Primary Examiner.*